(12) United States Patent  
Araki et al.

(10) Patent No.: US 7,623,202 B2
(45) Date of Patent: Nov. 24, 2009

(54) LIQUID CRYSTAL DISPLAY DEVICE

(75) Inventors: Shigesumi Araki, Ishikawa-gun (JP); Kazuhiro Nishiyama, Kanazawa (JP); Mitsutaka Okita, Mattou (JP); Daiichi Suzuki, Ishikawa-gun (JP)

(73) Assignee: Toshiba Matsushita Display Technology Co., Ltd, Tokyo (JP)

( * ) Notice: Subject to any disclaimer, the term of this patent is extended or adjusted under 35 U.S.C. 154(b) by 223 days.

(21) Appl. No.: 10/582,237

(22) PCT Filed: Dec. 8, 2004

(86) PCT No.: PCT/JP2004/018269

§ 371 (c)(1),
(2), (4) Date: Jun. 9, 2006

(87) PCT Pub. No.: WO2005/057276

PCT Pub. Date: Jun. 23, 2005

(65) Prior Publication Data

US 2007/0164956 A1  Jul. 19, 2007

(30) Foreign Application Priority Data

Dec. 11, 2003 (JP) ............................. 2003-412668

(51) Int. Cl.
G02F 1/133 (2006.01)
G02F 1/1335 (2006.01)
G02F 1/1337 (2006.01)

(52) U.S. Cl. ..................... 349/106; 349/33; 349/96; 349/107; 349/108; 349/109; 349/117; 349/123

(58) Field of Classification Search .............. 349/33, 349/96, 106–109, 117, 123
See application file for complete search history.

(56) References Cited

U.S. PATENT DOCUMENTS 6,005,646 A * 12/1999 Nakamura et al. ............ 349/33
6,122,021 A * 9/2000 Hirai et al. ................... 349/10
6,493,053 B1 * 12/2002 Miyachi et al. .............. 349/117
6,624,860 B1 * 9/2003 Narutaki et al. ............. 349/106
2004/0218115 A1 * 11/2004 Kawana et al. ................ 349/71

FOREIGN PATENT DOCUMENTS

| JP | 10-197862 | 7/1998 |
|---|---|---|
| JP | 2000-10532 | 1/2000 |
| JP | 2003-15161 | 1/2003 |
| JP | 2003-29303 | 1/2003 |

OTHER PUBLICATIONS

U.S. Appl. No. 10/577,059, filed Apr. 24, 2006, Okita, et al.
U.S. Appl. No. 10/577,045, filed Apr. 24, 2006, Suzuki, et al.

* cited by examiner

Primary Examiner—Frank G Font
Assistant Examiner—Jerry Blevins
(74) Attorney, Agent, or Firm—Oblon, Spivak, McClelland, Maier & Neustadt, L.L.P.

(57) ABSTRACT

It is possible to eliminate the blue tone in the black color display in the OCB liquid crystal display device. A liquid crystal display cell (110) includes an opposing substrate (130) having an opposing electrode (Ecom), an array substrate (120) having pixel electrodes of the respective colors (dpixR, dpixG, dpixB), a liquid crystal layer (140) arranged in a bend-arrangement and sandwiched between the opposing substrate (130) and the array substrate (120), and red, green, and blue filter layers (CF(R), CF(G), CF(B)) arranged on one of the substrates. The maximum voltage is applied when performing black color display on the display screen. At least the maximum voltage of the pixel electrode for blue color dpixB applied to the opposing electrode (Ecom) is made different from the maximum voltage of the pixel electrodes of the other colors applied to the opposing electrode (Ecom).

10 Claims, 14 Drawing Sheets (a)    (b)

(1H) first half / (1H) latter half

|   | $X_1$ | $X_2$ | $X_3$ | $X_4$ | $X_5$ | $X_6$ | ... |
|---|---|---|---|---|---|---|---|
| $Y_1$ | + (Vsig1) | − (Vsig2) | + (Vsig3) | − (Vsig4) | + | − | |
| $Y_2$ | − | + | − | + | − | + | |
| $Y_3$ | + | − | + | − | + | − | |
| $Y_4$ | − | + | − | + | − | + | |
| $Y_5$ | + | − | + | − | + | − | |
| $Y_6$ | − | + | − | + | − | + | |

(b)

(1H) first half / (1H) latter half

|   | $X_1$ | $X_2$ | $X_3$ | $X_4$ | $X_5$ | $X_6$ | ... |
|---|---|---|---|---|---|---|---|
| $Y_1$ | − (Vsig1) | + (Vsig2) | − (Vsig3) | + (Vsig4) | − | + | |
| $Y_2$ | + | − | + | − | + | − | |
| $Y_3$ | − | + | − | + | − | + | |
| $Y_4$ | + | − | + | − | + | − | |
| $Y_5$ | − | + | − | + | − | + | |
| $Y_6$ | + | − | + | − | + | − | |

LIQUID CRYSTAL DISPLAY DEVICE

TECHNICAL FIELD

The present invention relates to a liquid crystal display device, and more particularly to a liquid crystal display device employing the optically compensated birefringence (OCB) technology enabling realization of a wide viewing angle and high speed response.

TECHNICAL BACKGROUND

Liquid crystal display devices are put in practical use in various application fields with taking advantage of the characteristics thereof such as lightweight, a thin outline, and less power consumption.

Twisted nematic (TN) type liquid crystal display devices now widely utilized in the market have a structure in which liquid crystal material thereof having optically positive refractive index anisotropy is arranged between the substrates in such a manner as to be twisted by approximately 90 degrees, so that optical rotatory property of the incident light is regulated upon controlling the twisted alignment. Although the TN type liquid crystal display device can be manufactured comparatively easily, it is not suitable to display moving pictures such as TV images because the viewing angle is narrow and the response speed is slow.

For improving the viewing angle and the response speed, on the other hand, the OCB type liquid crystal display device has been focused on. The OCB type liquid crystal display device, which has a liquid crystal material capable of forming bend alignment sealed between the substrates, has some advantages that the response speed can be improved by one digit in comparison with the TN type liquid crystal display device and furthermore the viewing angle can be widened because it is optically self-compensated thanks to the alignment condition of the liquid crystal material. When image display is carried out with use of the OCB type liquid crystal display device, it is considered upon controlling birefringence and combining with a polarization plate that the light is shut off (the black display) in the condition where a higher voltage is applied thereto, or passes therethrough (the white display) in the condition where a lower voltage is applied thereto. In this case, it is well known that phase difference of the liquid crystal layer in the black display condition is compensated and the transmittance is sufficiently diminished upon, for example, combining with a mono-axial phase difference plate.

Though liquid crystal molecules are arranged along the direction of electric field (in the direction normal to the substrate) by applying a higher voltage in the black display condition, liquid crystal molecules in the vicinity of the substrate are not arranged in the normal direction to the substrate due to the interaction with the alignment layer, so that the light is affected by the phase difference in the specified direction. As a result, when observation is carried out from the direction normal to the substrate (the front direction of the display screen), the transmittance in the black display condition cannot be sufficiently decreased, so that the above phenomenon gives rise to deterioration of the contrast. As disclosed, for example, in the Patent Document 1, combining with a hybrid arranged optically negative phase difference plate is known as a measure to compensate sufficiently the black display or gray scale characteristics for the observation in the front direction and moreover the oblique direction.

Patent Document 1: Japanese Laid-open Patent Publication Hei10-197862

DISCLOSURE OF THE INVENTION

Problems to be Solved by the Invention

The color liquid crystal display device forms an image with an incident light such as the natural light or a back light with high color rendering reflected or transmitted through each color filter layer, wherein lights spreading over the whole light wavelength region are selected by the wavelength pass band of each filter layer.

As the optical rotatory property is utilized for display in the TN type liquid crystal display device, internal reflection of the light between the substrates has little effect on the display. However in the OCB liquid crystal display device, retardation of the incident light passing through the liquid crystal layer disagrees with retardation of the phase difference plate due to the number of times of the internal reflection. This causes a problem that the balance of color is disrupted. Moreover, because the internally reflected light also has wavelength dispersion, disruption of balance of the balance of color gets more and more increased. Especially, because blue light of short wavelength is greatly affected by the wavelength dispersion, the image is liable to be tinged with blue in the black display.

The present invention is intended to provide a liquid crystal display device that has a high response speed and an excellent balance of color.

Means to Solve the Problems

The present invention makes the voltage supplied to at least the blue pixel electrode be different from the voltage supplied to the pixel electrode of the other color in the black display. In accordance with the above, color balance is regulated upon compensating an unnecessary light leaking from the blue filter with other colors.

Red, green, and blue lights of the spectrum mentioned here correspond to wavelength regions passing through respective color filter layers, e.g. red light of 580 nm or more, green light of 510 to 580 nm, and blue light of 400 to 550 nm.

The first of the present invention comprises;

a liquid crystal display cell comprising an array substrate having a pixel electrode for each color of red, green and blue arranged on the display screen in a matrix form, an opposing substrate having an opposing electrode arranged in such a manner as to face the pixel electrodes of the array substrate, an alignment layer formed on the pixel electrode and the opposing electrode, a liquid crystal layer arranged in a bend alignment interposed between the array substrate and the opposing substrate, and a filter comprising a red filter layer, a green filter layer and a blue filter layer provided on one side of the substrate, the red filter layer being arranged corresponding to the red pixel electrode, the green filter layer being arranged corresponding to the green pixel electrode, and the blue filter layer being arranged corresponding to the blue pixel electrode;

a phase difference plate arranged on at least one of main surfaces of the liquid crystal display cell;

a pair of polarization plates arranged so as to interpose the liquid crystal display cell and the phase difference plate in the crossed-Nicol configuration; and a voltage supplying means to supply a voltage in a predetermined range between the opposing electrode and the red, green, blue pixel electrodes so as to obtain a gray scale of the display screen, wherein the voltage supplying means supplies a voltage, which becomes the highest at each color in the black display of the display screen and makes the highest voltage of the pixel electrode of one color be different from the highest voltage of the electrode of the other color.

It is desirable for the voltage supplying means that at least the voltage at the blue pixel electrode is different from the voltage at the red or green pixel electrode.

Moreover it is desirable that the maximum voltages for the red, green and blue pixel electrodes are different from each other in order that the summed retardation value of the liquid crystal layer and the phase difference plate of the liquid crystal display cell becomes zero at the position of the red, green and blue pixel electrodes when the display screen is in the black display.

Additionally, it is desirable that the summed retardation value of the blue pixel electrode becomes zero at a wavelength shorter than the light wavelength of 450 nm.

Furthermore, it is desirable that the maximum voltage supplied to the blue pixel electrode is higher than the maximum voltage at which the summed retardation value becomes zero.

The second of the present invention further provides a liquid crystal display device comprising;

a liquid crystal display cell comprising an array substrate having pixel electrodes for each color of red, green and blue arranged in a matrix form on a display screen, an opposing substrate having an opposing electrode arranged in such a manner as to face the pixel electrodes of the array substrate, an alignment layer formed on both the pixel electrodes and the opposing electrodes, a liquid crystal layer interposed between the array substrate and the opposing substrate, and arranged in a bend alignment, and a filter comprising a red filter layer, a green filter layer and a blue filter layer provided on one side of the substrate, the red filter layer being arranged corresponding to the red pixel electrode, the green filter layer being arranged corresponding to the green pixel electrode, and the blue filter layer being arranged corresponding to the blue pixel electrode;

a phase difference plate arranged on at least one of main surfaces of the liquid crystal display cell;

a pair of polarization plates arranged so as to interpose the liquid crystal display cell and the phase difference plate in the crossed-Nicol configuration;

a means for supplying the maximum voltages between the opposing electrode and the red, green, blue pixel electrodes, the maximum voltages being different from each other for the red, green, blue pixel electrodes; and a backlight source arranged on one side of the polarization plate, having light emission peaks in light wavelength regions appropriate to the red, green, and blue filter layers respectively, and the blue wavelength region having light emission peaks at a longer wavelength side and a shorter wavelength side with reference to 450 nm.

For the liquid crystal display device like the above, it is also desirable that the summed retardation value of the blue pixel electrode becomes zero at a wavelength shorter than the light wavelength of 450 nm.

Furthermore, it is desirable that the maximum voltage supplied to the blue pixel electrode is higher than the maximum voltage at which the summed retardation value becomes zero.

The same effect can be obtained upon setting the maximum voltage of the blue pixel electrode to the voltage at which the v' value of the u'v' chromaticity diagram becomes the maximum.

Furthermore, the same effect can be obtained upon setting the maximum voltage of the blue pixel electrode to the voltage at which the Z value of the XYZ stimulus value becomes the minimum.

EFFECTS OF THE INVENTION

The present invention can control for example a tinge of blue of the displayed image in the black display of the display screen in the OCB mode liquid crystal display.

The OCB mode display relating to the present invention is to control the phase of passing light upon combining the liquid crystal display cell with the phase difference plate and varying the summation of retardation values thereof, and represented by the following:

$$Re = (ne - no)d = \Delta n \cdot d \quad (1),$$

where the retardation value of the liquid crystal display cell is represented by Re.

Here, 'no' denotes ordinary index; 'ne' denotes extraordinary index; and 'd' denotes thickness of the liquid crystal layer. The OCB liquid crystal layer employing p type liquid crystal having positive dielectric anisotropy has a positive retardation value, and the phase difference plate combined with the liquid crystal layer above has a negative retardation value.

As shown in FIG. 19, when the liquid crystal display panel is composed of the liquid crystal display cell 11, the phase difference plate 20 and a pair of the polarization plates 22 arranged in the crossed-Nicol configuration to each other, light transmittance (T) is represented as follows:

$$(T) \propto \sin 2(Ret(V,\lambda)/\lambda) \quad (2),$$

where Ret denotes summation of retardation values of the liquid crystal layer and the phase difference plate; V denotes voltage supplied to the liquid crystal layer; and λ denotes wavelength of the light.

FIG. 13 shows an example of Δnd/λ to the wavelength λ in the liquid crystal layer used for the OCB mode display. Because the value increases as the wavelength becomes shorter, it is difficult to control it even if a phase difference plate having a similar tendency is combined therewith. Therefore, light leakage due to light dispersion of short wavelength light is liable to increase.

FIG. 14 shows the brightness of the red, green and blue in the black display of the liquid crystal display panel employing the above mentioned liquid crystal cell having a uniform thickness as the brightness ratio normalized by the blue brightness in the front direction of the display screen and viewed at the viewing angle (deg) oblique to right and left directions from the front direction. It is recognized that there is a great disparity between the blue brightness ratio and the red, green brightness ratios in the right and left directions, especially 60 degrees to the right, so that light leakage due to light dispersion of short wavelength light is liable to increase even in an oblique viewing angle.

FIG. 15 shows the front in the white display by the point A (0.195, 0.452), the front in the black display by the point B (0.194, 0.358), and 60 degrees to the right in the black display by the point C (0.173, 0.314) in the u'v' chromaticity diagram. The figure shows that there is a great disparity between the point B of the chromaticity in the black display and the point A of the chromaticity in the white display. Furthermore, it shows that the chromaticity at the viewing angle of 60 degrees to the right is largely deviated toward blue side from the point A of the chromaticity in the white display.

In consequence, in FIG. 15, it is necessary that the point B in the black display should be moved in the vicinity of the point A in the white display in order to assure the chromaticity in the black display equal to that in the white display. Additionally, it is necessary that the point C of 60 degrees to the right should be moved in the vicinity of the point A in order to assure the chromaticity of 60 degrees to the right equal to that of the front direction.

FIG. 12 shows the spectral radiation brightness characteristics of a typical cold cathode fluorescent lamp used for the backlight source, which has emission peaks in red, green and blue regions respectively. The red filter characteristic CR, the green filter characteristic CG and the blue filter characteristic CB of the filter of the liquid crystal display cell have a transmittance containing the respective emission peaks. Moreover the spectrum of blue light has the center of blue at 450 nm and emission peaks at 490 nm of longer wavelength side and 435 nm of shorter wavelength side on the basis of the center.

As shown in the formula (2) described above, the transmittance (T) of the liquid crystal display panel containing the phase difference plate and the polarization plate becomes the minimum at a point of some wavelength, so that the transmittance increases as the wavelength deviates from the point. Making use of the retardation value (Re) of the liquid crystal layer changed by the applied voltage in the OCB mode as shown in the formula (2), the present invention sets the voltages applied to the red, green and blue pixel electrodes in such a manner as to make the transmittance at the specified wavelengths in the spectral regions of respective colors become the minimum upon making these voltages be different from each other.

However, the spectral width of blue light region is wide. Therefore, even if the minimum transmittance is obtained at a specified wavelength, the transmittance at a wavelength apart from the specified wavelength is increased.

FIG. 16 shows the u'v' chromaticity diagram (CIE1976UCS chromaticity diagram) in the front direction of the display screen in the black display when the applied voltage to the blue pixel electrode is varied in such a manner that Ret of the blue light region becomes zero at a short wavelength of 450 nm or less.

The color of the light source corresponds to the point A (0.208, 0.456). It is shown that the chromaticity B in the black display is varied by the voltage with respect to the point A. The applied voltage is for example 3 V to 5 V. It is recognized that the chromaticity point Bmax (0.188, 0.415) (V3) at which v' value becomes the maximum exists as the voltage is gradually decreased to V1 (4.28V), V2 (4.15V), V3 (4.03V), and V4 (3.88V) Because the chromaticity Bmax gets close to the point A, the color balance in the black display becomes excellent.

FIG. 17 shows the spectrum characteristics of blue color region with the above mentioned voltages from V1 to V4 as the parameter. The transmittance at 450 nm or less out of the twin light emission peaks of the backlight source is suppressed the most at the voltage V3, thereby the chromaticity with good balance in the black display can be realized. Although FIG. 16 shows the chromaticity at the front of display screen in the black display, the same effect is also recognized at an oblique viewing angle.

FIG. 18 shows variation in the values of Y and Z (normalized value) out of the XYZ stimulus values and in the value of v' chromaticity against the voltage of the blue pixel electrode. Here, v' chromaticity becomes the maximum at the above mentioned voltage V3. The voltage at which the value of Y becomes the minimum is different from the voltage at which v' chromaticity becomes the maximum. On the other hand, the voltage at which the value of Z becomes the minimum is nearly equal to the voltage V3 at which v' chromaticity becomes the maximum. Therefore, if the maximum voltage of the blue pixel electrode is set to be the voltage at which the value of Z becomes the minimum, the effect obtained is substantially the same as the case where the maximum voltage of the blue pixel electrode is set to be the voltage at which v' chromaticity becomes the maximum.

PREFERRED EMBODIMENTS TO IMPLEMENT THE INVENTION

Referring to the Drawings, a Liquid Crystal Display Device as an embodiment of the present invention will be explained hereinafter.

Embodiment 1

FIG. 1 shows a schematic block diagram of the liquid crystal display device according to the OCB mode system of the embodiment.

The liquid crystal display device 1 having the aspect ratio of 16:9 and the diagonal of 22 inches comprises a liquid crystal display panel 100 of light transmission active matrix type, a backlight 300 constituted of a plurality of tubular light sources 310 arranged in parallel together (Refer to FIG. 11) and located at the back of the liquid crystal display panel, scanning line drive circuits Ydr1, Ydr2 (Refer to FIG. 4) accommodated in the liquid crystal display panel 100 and supplying a scan signal Vg to a scanning line Yj, a signal line drive circuit 500 comprised of TCP (Tape Carrier Package) supplying a signal voltage Vsig to a signal line Xi (Refer to FIG. 4), an opposing electrode drive circuit 700 supplying an opposing electrode voltage Vcom to an opposing electrode Ecom (Refer to FIG. 2), and a control circuit 900 controlling the scanning line drive circuits Ydr1, Ydr2, the signal line drive circuit 500 and the opposing electrode drive circuit 700. The liquid crystal display panel 100 is interposed by a backlight 300 and a frame-like bezel 1000 (Refer to FIG. 1).

As shown in FIG. 3, the liquid crystal display panel 100 comprises a liquid crystal display cell 110, a front hybrid phase difference plate 200a, a front double-axial phase difference plate 210a, a front polarization plate 220a, a rear hybrid phase difference plate 200b, a rear double-axial phase difference plate 210b and a rear polarization plate 220b. The front hybrid phase difference plate 200a, the front double-axial phase difference plate 210a and the front polarization plate 220a are integrally composed, and the rear hybrid phase difference plate 200b, the rear double-axial phase difference plate 210b and the rear polarization plate 220b are also integrally composed, and then they are stuck on both the main surfaces of the liquid crystal display cell 110.

<Composition of the Liquid Crystal Display Cell>

As shown in FIG. 2, the liquid crystal display cell 110 is composed of an array substrate 120 having pixel electrodes for display Dpix, i.e. red pixel electrodes dpixR, green pixel electrodes dpixG and blue pixel electrodes dpixB arranged in a matrix alignment, an opposing substrate 130 having an opposing electrode Ecom located facing the pixel electrodes for display Dpix on the array substrate, an alignment layers 151, 153 coated on the electrodes Dpix, Ecom between the array substrate 120 and an opposing substrate 130, and a liquid crystal layer 140 interposed via the alignment layers.

On the main surface of the opposing substrate 130, a light shield layer BM, a red filter layer CF(R), a green filter layer CF(G), and a blue filter layer CF(B) are regularly arranged.

The pixel electrode for display Dpix is an electrode forming one pixel with a trio of a pixel electrode for red dpixR, a pixel electrode for green dpixG, and a pixel electrode for blue dpixB, all of them being defined as respective sub-pixels, provided on the array substrate.

<Structure of the Array Substrate>

Referring to FIG. 4 to FIG. 7, the array substrate 120 will be explained.

The array substrate 120 has a transparent glass substrate GLS1 on which a plurality of signal lines Xi formed by aluminum (Al) and a plurality of scanning lines Yj formed by molybdenum-tungsten alloy (MoW) are arranged in a matrix form via an inter-layer insulator film INS2 of silicon oxide (SiO2). Additionally, auxiliary capacitance lines Cj prepared in the same process as the scanning lines Yj are located in parallel with the scanning lines Yj.

In the vicinity of the intersection of the signal line Xi and the scanning line Yj, a pixel electrode for display Dpix formed by ITO (Indium Tin Oxide) as a transparent electrode is located on a thin film transistor TFT of the top gate structure having a polycrystalline silicon (p-Si) as an active layer via a passivation film INS3. In more detail, this TFT is formed in the double gate structure so as to diminish the off-leak current, and has P type source-drain regions p-Si(s), p-Si(d), channel regions p-Si(c1), p-Si(c2) and a connecting region p-Si(i) placed between the channel region p-Si(c1) and p-Si (c2) in the p-Si film. The drain region p-Si(d) is connected with the signal line Xi through a contact hole CH1. The source region p-Si(s) is pulled about by a source line EXT of Al through a contact hole CH2 and connected with the pixel electrode for display Dpix through a contact hole CH3.

On the p-Si film, a gate insulation film INS1 of TEOS is located. Furthermore, a first gate electrode G1 extended from the scanning line Yj is positioned and a part of the scanning line Yj is wired as a second gate electrode G2 on the gate insulation film. The first gate electrode G1 corresponds to the first channel region p-Si(c1), and the second gate electrode G2 corresponds to the second channel region p-Si(c2).

The source region p-Si(s) of the TFT includes a source region extended portion p-Si(se) (FIG. 6), and is electrically connected through a contact hole CH4 with a second auxiliary capacitance electrode EC2, which is located on a first auxiliary capacitance electrode EC1 of MoW extended from the auxiliary capacitance line Cj and prepared in the same process as the auxiliary capacitance line Cj, via an inter-layer insulation film INS2. The second auxiliary capacitance electrode EC2 is constituted of Al formed in the same process as the signal line Xi. Furthermore, on the second auxiliary capacitance electrode EC2, a pixel electrode for phase transition Tpix formed in the same process as the pixel electrode for display Dpix is positioned through a passivation film INS3, and the pixel electrode for phase transition Tpix is electrically connected with the second auxiliary capacitance electrode EC2 via a contact hole CH5.

According to the structure mentioned above, a holding capacitance Cs (FIG. 4) is formed between the first auxiliary capacitance electrode EC1 and the second auxiliary capacitance electrode EC2. Because the pixel electrode for phase transition Tpix is located on the holding capacitance Cs, a large holding capacitance Cs can be effectively assured without decreasing the aperture ratio.

Moreover, in this embodiment, because the pixel electrode for display Dpix and the pixel electrode for transition Tpix are located straddling the scanning line Yj and connected together through the source region extended portion p-Si(se) independent of the source region p-Si(s) of the TFT, remedy can easily be executed upon disconnecting electrically the source region extended portion p-Si(se) by means of e.g. laser radiation even if the holding capacitance Cs is shorted.

The pixel electrode for display Dpix of the neighboring horizontal line and the pixel electrode for phase transition Tpix, which are adjacent to each other on the auxiliary capacitance line Cj, are structured like a comb-teeth shape which has opposing edge sides thereof being engaged with each other. This structure can form uniformly a core of bend upon supplying a twisted transversal electric field between the pixel electrode for display Dpix and the pixel electrode for phase transition Tpix, so that the initial spray alignment condition can be uniformly led to the bend alignment condition. The comb-teeth pitch can lead to a uniform alignment at a low voltage by, for example, the pitch being smaller than 50 μm, preferably 20 to 30 μm.

As shown in FIG. 4, both ends of the scanning line Yj are electrically connected with scanning line drive circuits Ydr1, Ydr2 integrally constituted on the glass substrate GLS1 respectively. A vertical scanning clock signal YCK and a vertical start signal YST are inputted to the scanning line drive circuits Ydr1 and Ydr2 respectively. The both ends of the auxiliary capacitance line Cj are connected to the connecting line Ccs so as to input the auxiliary capacitance voltage Vcs through the connecting line Ccs.

The signal line Xi is connected to a signal input line xk (k=i/2) via a select switch SEL. In detail, the signal lines Xi are divided into odd number signal lines Xi (i=1, 3, 5, . . . ) and even number signal lines Xi (i=2, 4, 6, . . . ), and a pair of neighboring odd number signal lines Xi, Xi+2 are connected to the same signal input line xk through select switches SEL1, SEL3, and a pair of neighboring even number signal lines Xi+1, Xi+3 are connected to the same signal input line xk+1 through select switches SEL2, SEL4. Wiring is carried out so as to satisfy following conditions: The select switch SEL1 connected to one of the odd number signal line pairs and the select switch SEL4 connected to one of the even number signal line pairs are selected by a first select signal Vsel1; and the select switch SEL3 connected to the other of the odd number signal line pairs and the select switch SEL2 connected to the other of the even number signal line pairs are selected by a second select signal Vsel2.

As shown in FIG. 8(a), for example, a signal voltage Vsig1 positive (+) to an opposing electrode voltage Vcom is written to the pixel electrode for display Dpix corresponding to the signal line X1, and a signal voltage Vsig4 negative (−) to the opposing electrode voltage Vcom is written to the pixel electrode for display Dpix corresponding to the signal line X4 in the first half of one horizontal scanning period (1H). A signal voltage Vsig2 negative (−) to an opposing electrode voltage Vcom is written to the pixel electrode for display Dpix corresponding to the signal line X2, and a signal voltage Vsig3 positive (+) to the opposing electrode voltage Vcom is written to the pixel electrode for display Dpix corresponding to the signal line X3 in the latter half of one horizontal scanning period (1H). As shown in FIG. 8(b), a signal voltage Vsig1 negative (−) to an opposing electrode voltage Vcom is written to the pixel electrode for display Dpix corresponding to the signal line X1, and a signal voltage Vsig4 positive (+) to the opposing electrode voltage Vcom is written to the pixel electrode for display Dpix corresponding to the signal line X4 in the first half of one horizontal scanning period (1H) of the next frame. A signal voltage Vsig2 positive (+) to an opposing electrode voltage Vcom is written to the pixel electrode for display Dpix corresponding to the signal line X2, and a signal voltage Vsig3 negative (−) to the opposing electrode voltage Vcom is written to the pixel electrode for display Dpix corresponding to the signal line X3 in the latter half of one horizontal scanning period (1H).

As mentioned above, frame inversion driving and dot inversion driving are carried out. Thereby, undesirable supply of DC voltage can be prevented and also occurrence of flicker can be effectively prevented. In addition, because number of connections between the signal line drive circuit 500 and the liquid crystal display panel 100 decreases to a half the number i of the signal lines Xi, connecting process there of can be largely reduced and improvement of production yield, progress in anti-shock characteristic, etc. can be achieved thanks to a less number of connection. Furthermore, limitations of connection pitch accompanied by progress toward the high definition can be broadened. For example, high definition of less than 80 μm can be achieved.

In the embodiment described above, though the signal voltage Vsig inputted from a signal input line xk in one horizontal scanning period (1H) is serially divided into every other two signal lines Xi, Xi+2, it can be divided into three signal lines or four signal lines. Thereby, number of connection can be further decreased. However, increase in the number of dividing results in reduction of the writing time, so that it should be designed in accordance with the ability, etc. of the TFT.

Red signal, green signal and blue signal are inputted into the signal input line xk from the signal line drive circuit 500.

In the figure, the red signal is denoted by Vsig1(R) and Vsig4(R); the green signal is denoted by Vsig2(G); and the blue signal is denoted by Vsig3(B). The signal lines X1 and X4 are for red (R); the signal line X2 is for green (G); and the signal line X3 is for blue (B).

The signal voltage in the black display is selected so as to become the maximum voltage (on-voltage) in the OCB mode, and the signal drive circuit 500 outputs a signal voltage of a predetermined range supplied between the opposing electrode and each pixel electrode. Gray scale is controlled by each supplied voltage. In addition, the output is carried out in such a manner that the maximum voltage for each color is different from each other. For example, the maximum voltage for red signal is 4.70 V; the maximum voltage for green signal is 4.47 V; and the maximum voltage for blue signal is 4.03 V. A variant example in which the red signal voltage and the green signal voltage in the black display are the same, and only the blue signal voltage is different is possible. Upon varying the maximum voltage of blue signal in the black display, v' value of the u'v' chromaticity diagram in the front direction of the display screen is regulated so as to have the maximum value when the wavelength at which the summed retardation value Ret of the liquid crystal display cell and the phase difference plate becomes zero is selected to be shorter than 450 nm.

<Structure of the Opposing Substrate>

As shown in FIG. 2 and FIG. 3, the opposing substrate 130 is constituted of a matrix-formed light shield layer BM interrupting undesirable leak-lights, filter layers CF(R), CF(G), CF(B) of red R, green G, and blue B provided so as to correspond to each of pixel electrodes for display dpixR, dpixG, and dpixB respectively acting as filters CF for color display, and a transparent opposing electrode Ecom of indium tin oxide (ITO) on a glass substrate GLS2. Here, CF(B) is the thickest, and CF (G), CF(R) are formed in such a manner as to become thinner in this order. CF(R), CF(G), CF (B) are arranged adjacently in order.

Post spacers of resin (not shown in the figure) are arranged on the opposing electrode Ecom in order to maintain the gap to the array substrate 110. The spacers are arranged regularly at a rate of one to a plurality of pixels. The position corresponding to the spacer on the array substrate is a broad area Xa on the signal line shown in FIG. 5.

<Structure of the Liquid Crystal Display Panel>

The structure of the liquid crystal display panel 100 will be explained next in more detail.

As shown in FIG. 2, rubbing process is executed on alignment layers 151 and 153 positioned on the respective main surfaces of the arrays of the substrate 120 and the opposing substrate 130, in such a manner that rubbing directions Ra and Rb (Refer to FIG. 9 and FIG. 10) are vertically in approximately parallel together and in the same direction on the substrates 120 and 130. Pre-tilt angle (θ) is set to be approximately 10 degrees. The liquid crystal layer 140 is interposed by both the substrates 120 and 130. Positive dielectric constant anisotropic p-type nematic liquid crystal whose liquid crystal molecules take the bend alignment when a predetermined voltage is supplied to the pixel electrode for display Dpix and the opposing electrode Ecom is employed for the liquid crystal layer 140.

As shown in FIG. 10(a), liquid crystal molecules 140a of the liquid crystal layer 140 take the spray alignment when a voltage is not supplied between the pixel electrode for display Dpix and the opposing electrode Ecom. Consequently, in order to shift to the bend alignment, a high voltage of about several ten volts is supplied between the pixel electrode for display Dpix and the opposing electrode Ecom when the power is turned on. For carrying out surely the phase transition, a voltage of reverse polarity is written sequentially into every neighboring horizontal pixel line when the high voltage is supplied. Thereby nucleation is carried out upon giving a transversal twisted potential difference between the neighboring pixel electrode for display Dpix and the pixel electrode for phase transition Tpix, and phase transition is carried out around the core. The spray alignment state is transferred to the bend alignment state by executing such action for about 1 sec., and furthermore the potential difference between the pixel electrode for display Dpix and the opposing electrode Ecom is set to be the same potential so as to erase undesirable history once.

After the liquid crystal layer is transferred to the bend alignment state like the above, a voltage higher than a low off-voltage Voff is supplied to the liquid crystal molecules 140a to maintain the bend alignment state while it is operated as shown in FIG. 10(b). Upon varying the voltage in the range between the off-voltage and the on-voltage higher than the off-voltage, alignment state is changed between FIG. 10(b) and FIG. 10(c) and the retardation value of the liquid crystal layer 140 is changed by λ/2 to control the transmittance.

To achieve such operation, absorption axes Aa and Ab of a pair of polarization plates 220a and 220b are arranged to be orthogonal together and shifted from the rubbing directions Ra, Rb by π/4 in order to become the black display when the on-voltage Von (maximum voltage) is applied as shown in FIG. 9.

A front hybrid phase difference plate 200a and a rear hybrid phase difference plate 200b stuck between the outer surfaces of the array substrate 120 and the opposing substrate 130 and the polarization plates 220a, 220b compensate the retardation value RLCon (e.g. 80 nm) of the liquid crystal layer 140 when on-voltage is applied (in the black display), and moreover prevent undesirable leak of light from the front and oblique directions in the black display. Namely, the discotic liquid crystal constituting the hybrid phase difference plates 200a, 200b is an optically negative material whose refractive indices nx and ny are the same and whose refractive index nz in the optical axis is smaller than nx, ny. As shown in FIG. 9 and FIG. 10, the molecular optical axis Dopt tilts in the reverse direction to the oblique direction of the optical axis of the liquid crystal molecules 140a of the liquid crystal layer 140. The liquid crystal is so constituted that the tilting angle varies gradually in the direction of film thickness, and the retardation values RD are −40 nm respectively. Therefore, because the retardation value RLCon of the liquid crystal layer 140 is 80 nm in the black display, phase difference in the black display is compensated and thereby undesirable leak of light can be prevented.

Between the hybrid phase difference plates 200a, 200b and the polarization plates 220a, 220b, double-axial phase difference plates 210a, 210b are provided respectively. The double-axial phase difference plates 210a, 210b prevent leak of light caused by the optical rotatory property of the liquid crystal layer 140 in an oblique direction, and absorption axes Aa, Ab of the polarization plates 220a, 220b are coincided with the slow axis Ad. In consequence, the phase difference from the front direction can be approximately zero by combination with the polarization plates 220a, 220b, so that only wavelength dispersion in an oblique direction can be selectively improved.

<Structure of the Backlight>

Referring to FIG. 11, a backlight 300 located facing the polarization plate 220b will be explained.

The backlight 300 is comprised of a plurality of tubular light sources 310 arranged in parallel together as shown in the figure, a resin reflector 320 accommodating the tubular light sources 310 and emitting effectively the light from the tubular light sources 310 in the front direction, and an optical sheet located between the polarization plate 220b (Refer to FIG. 3) and the tubular light sources 310.

The optical sheet comprises a diffusion plate 340 of Tsujiden Co. for assuring brightness uniformity, and prism sheets 350, 360 of e.g. BEFIII of 3M Inc., which has a plurality of prism rows condensing the light emitted from the tubular light sources 310.

The tubular light source 310 is constituted of a lamp of high color rendering property represented by the three-wavelength cold cathode fluorescent tube having, for example, the luminous spectrum, which has a red light region with a peak at 610 nm, a green light region with a peak at 540 nm and a blue light region with peaks at 490 nm and 435 nm, as shown by the curve A of FIG. 12. Y2O3:Eu fluorescent material for red, LaPO4:Ce,Tb fluorescent material for green and BAM fluorescent material for blue are used as the fluorescent material excited by a ultraviolet ray of 147 nm in the case of employing xenon gas as the discharge gas of the lamp. However, other fluorescent materials are used in many cases. There is not a great difference between them as the luminous spectrum to obtain a high color rendering property.

Each color filter layers CF(R), CF(G), CF(B) of the liquid crystal display cell has the passing property C sharing a band pass of wavelengths respectively, the red filter layer CF(R) having the passing property of 580 nm or more represented by CR, the green filter layer CF(G) having the passing property of 580 to 510 nm represented by CG, and the blue filter layer CF(B) having the passing property of 550 to 400 nm represented by CB.

<Display Operation>

In accordance with the structure mentioned above, the light emitted from the tubular light source 310 passes through the polarization plate 220b via the light passage L as shown in FIG. 9. Here, only the polarized light having passed the transmission axis orthogonal to the absorption axes Aa, Ab of the polarization plate 220b is emitted, and enters into the liquid crystal display cell 110 through the rear double-axial phase difference plate 210b and the rear hybrid phase difference plate 200b.

Because the summed retardation of the liquid crystal layer 140 and the whole phase difference plates is approximately zero in the normal direction at on-voltage, the polarized light passes through as it is, and reaches the polarization plate 220a of the front side. The polarization plates 220a, 220b are positioned in the crossed-Nicol configuration alignment, so that the polarized light is absorbed by the front polarization plate 220a. Therefore the polarized light is cut off and the black display can be obtained.

As the retardation of the liquid crystal layer 140 varies in accordance with voltage supplying condition between the on-voltage and the off-voltage and thereby difference from the retardation of the whole phase difference plates varies, the incident light emitted from the front double-axial phase difference plate 210a becomes ecliptic polarization and reaches the front polarization plate 220a, so that the light passes through in accordance with the polarization condition. As mentioned above, gradation display can be done upon varying the applied voltage.

Though the case where the screen is tinged with blue in the black display has been explained by the embodiments described above, the present invention can set the maximum voltage of the red pixel electrode so as to be different from the maximum voltage of the other color pixel electrodes by controlling (increasing or decreasing) the maximum voltage of the red pixel electrode in comparison with the others when the screen is tinged with red, and also can set the maximum voltage of the green pixel electrode so as to be different from the maximum voltage of the other color pixel electrodes by controlling (e.g. increasing) the maximum voltage of the green pixel electrode in comparison with the others when the screen is tinged with green.

BRIEF DESCRIPTION OF THE DRAWINGS

FIG. 8(a) and FIG. 8(b) are diagrams explaining the displaying condition of the embodiment 1.

DESCRIPTION OF THE MARKS

Figure 1:
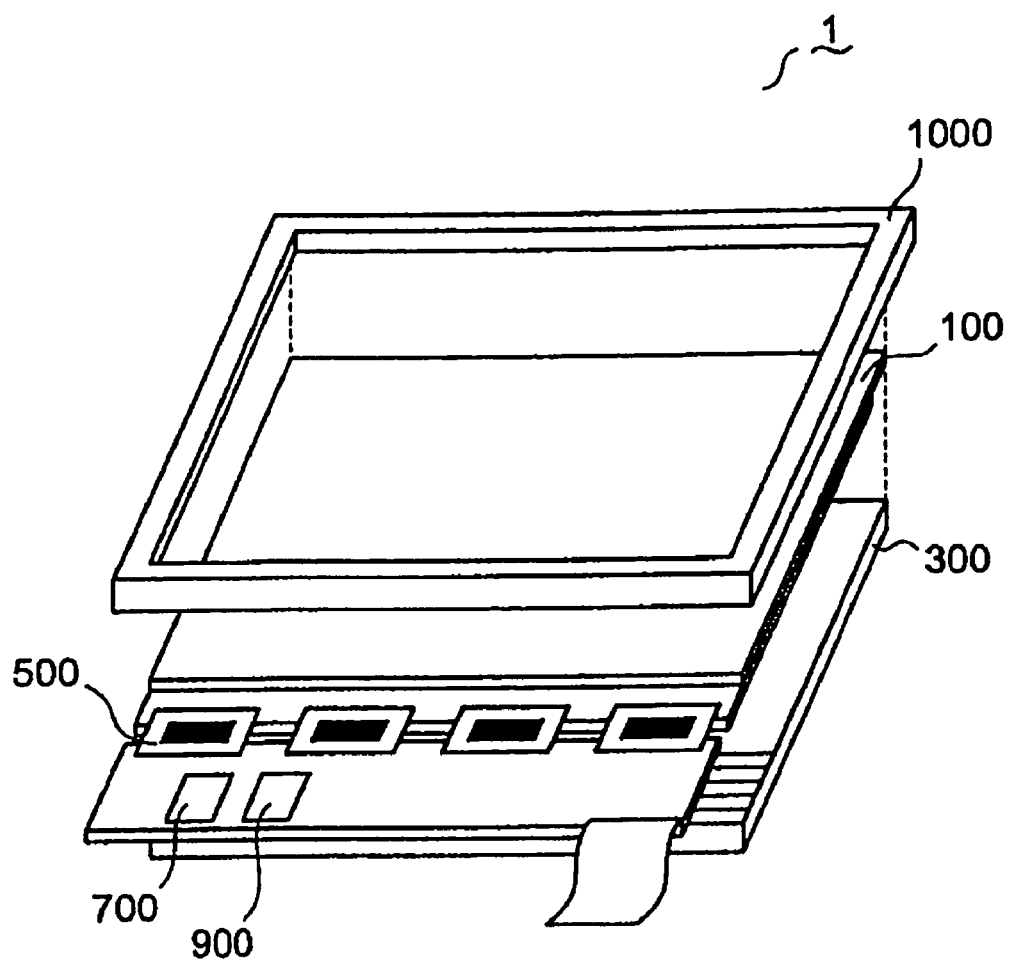
FIG. 1 is a schematic block diagram of the liquid crystal display device according to the embodiment 1 of the present invention.
Figure 2:
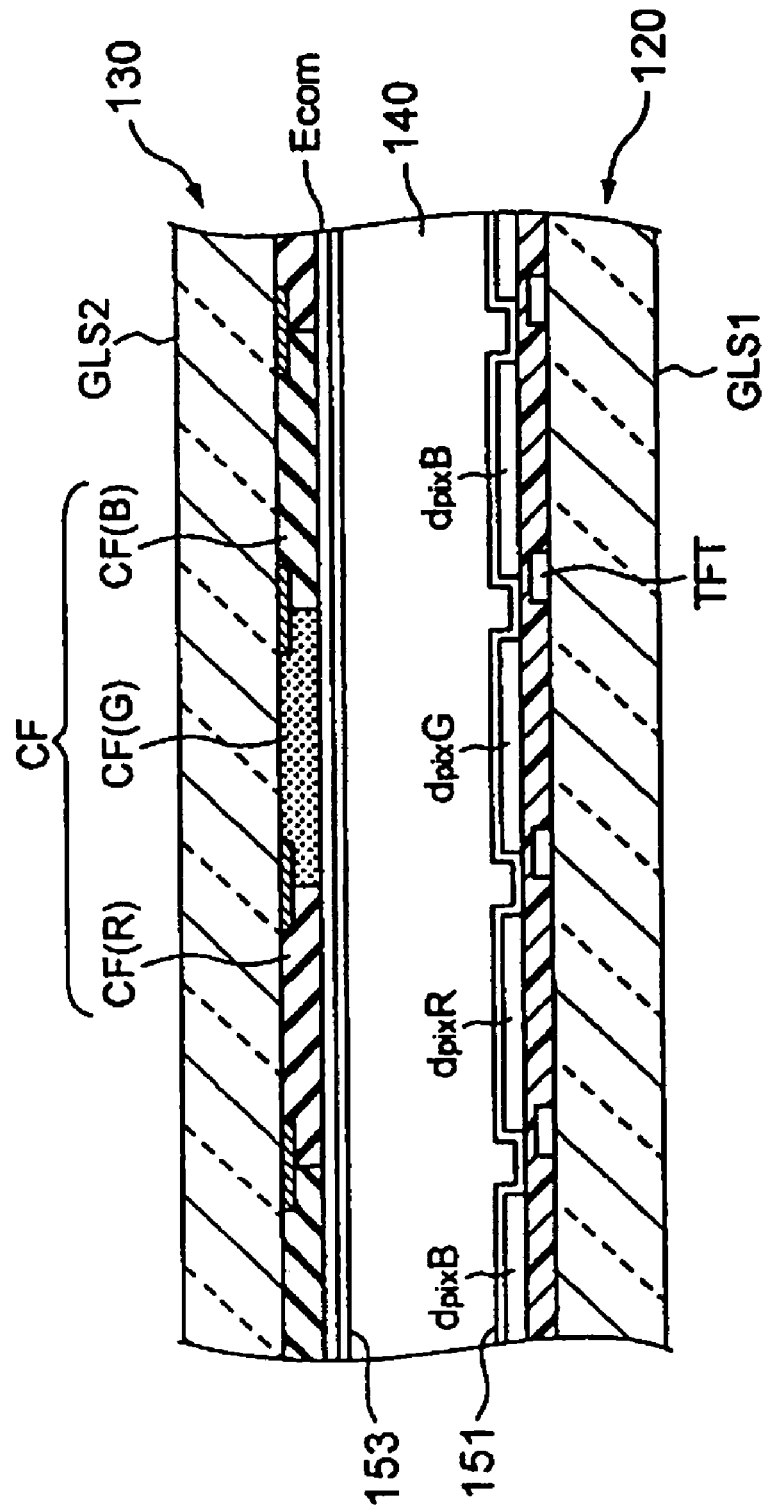
FIG. 2 is a partial cross sectional view of the liquid crystal display cell according to the embodiment 1.
Figure 3:
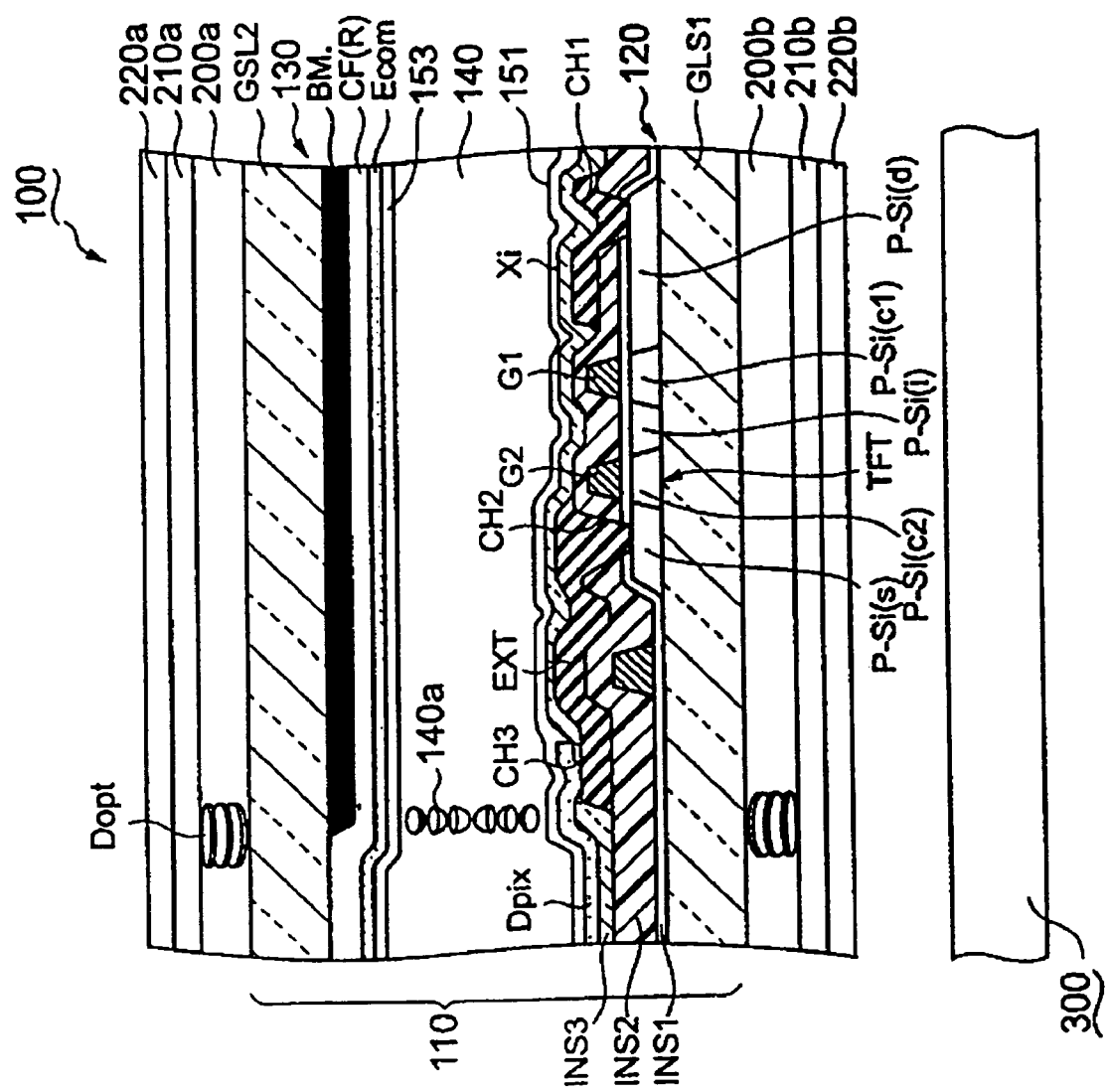
FIG. 3 is an enlarged partial cross sectional view of the liquid crystal display panel according to the embodiment 1.
Figure 4:
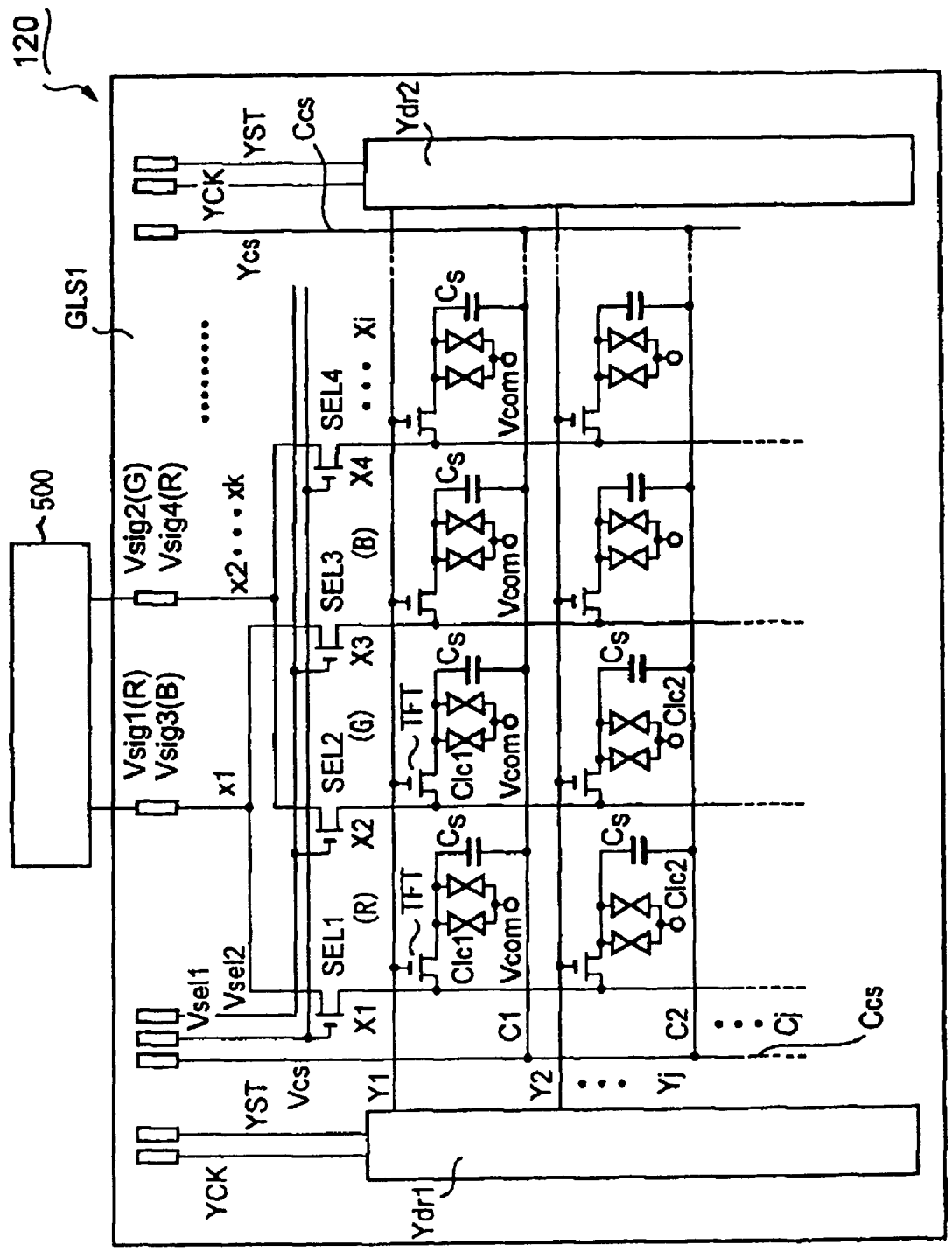
FIG. 4 is a schematic equivalent circuit diagram of the liquid crystal display cell according to the embodiment 1.
Figure 5:
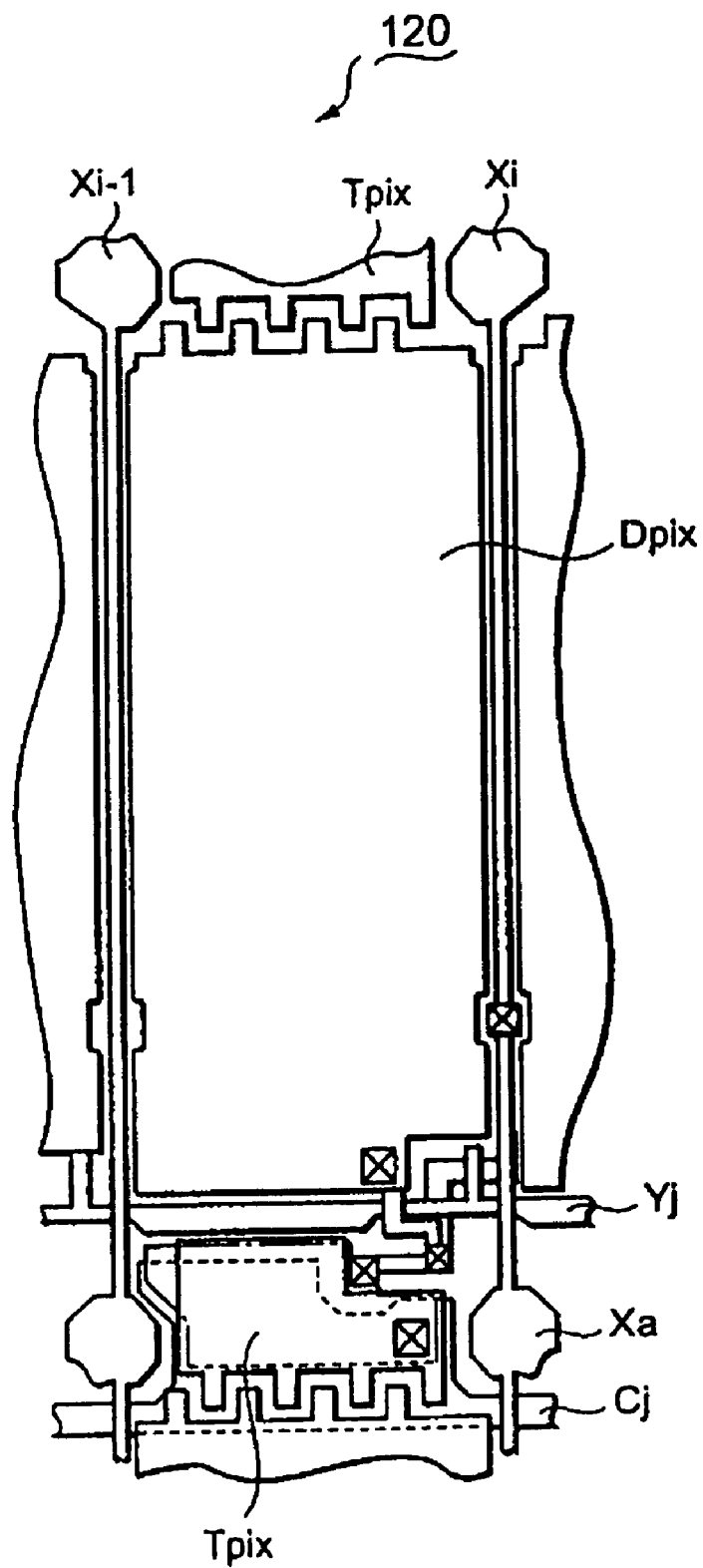
FIG. 5 is a partial schematic front view of the array substrate according to the embodiment 1.
Figure 6:
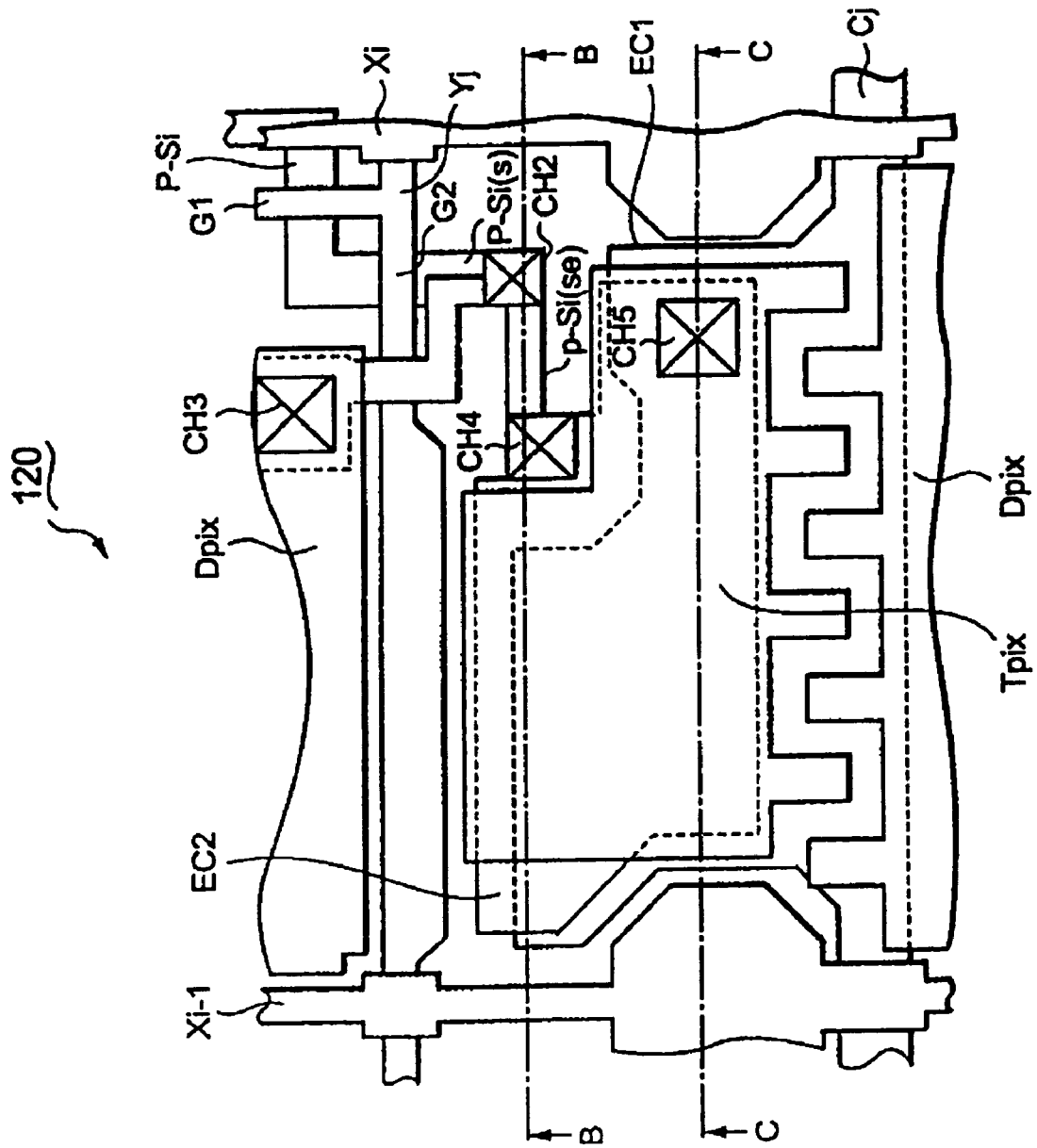
FIG. 6 is a partial schematic front view of the array substrate according to the embodiment 1.
Figure 7:
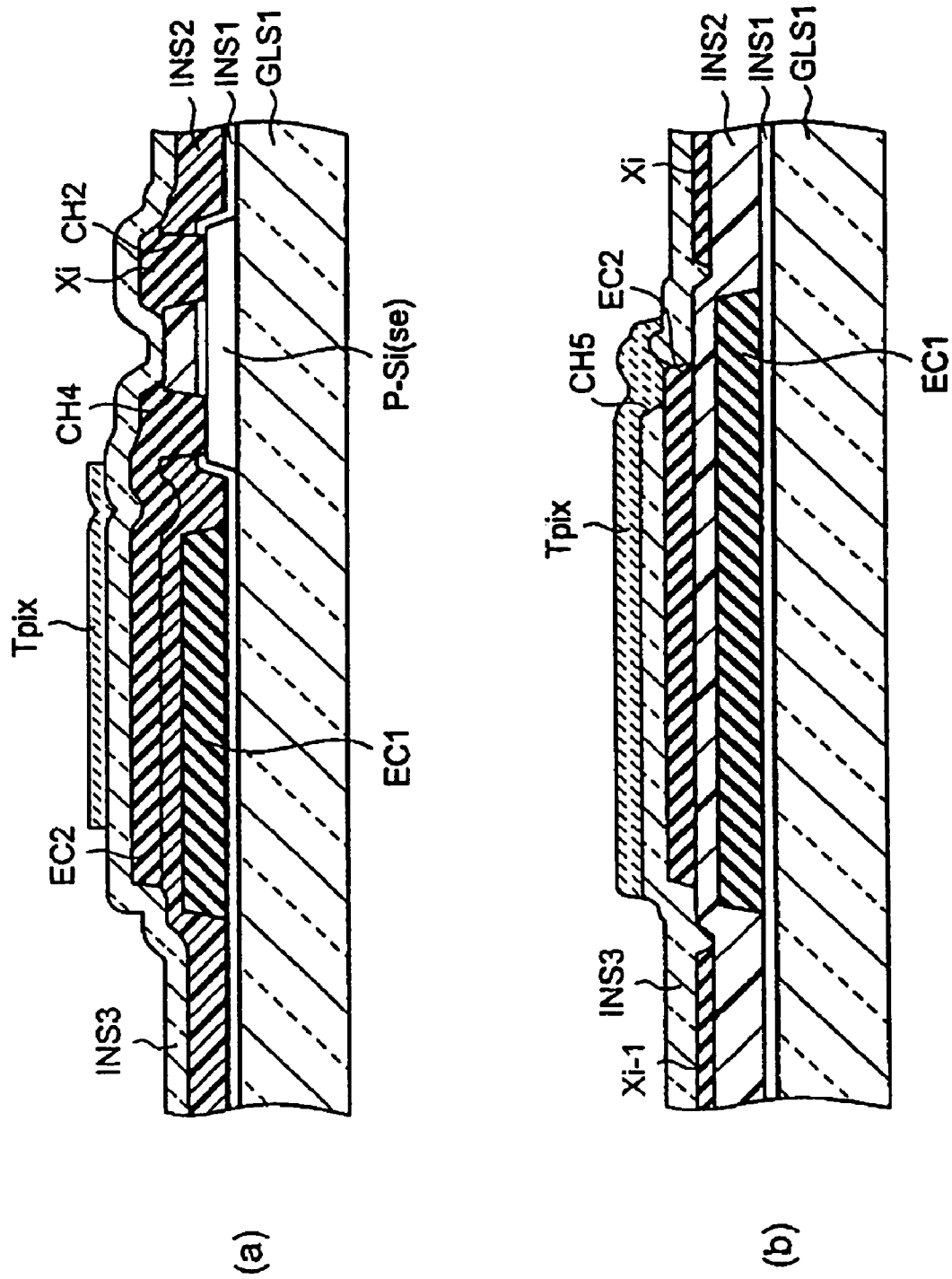
FIG. 7(a) is a partial schematic cross sectional view of the array substrate cut along B-B line in FIG. 6
FIG. 7(b) is a partial schematic cross sectional view of the array substrate cut along C-C line in FIG. 6.
Figure 9:
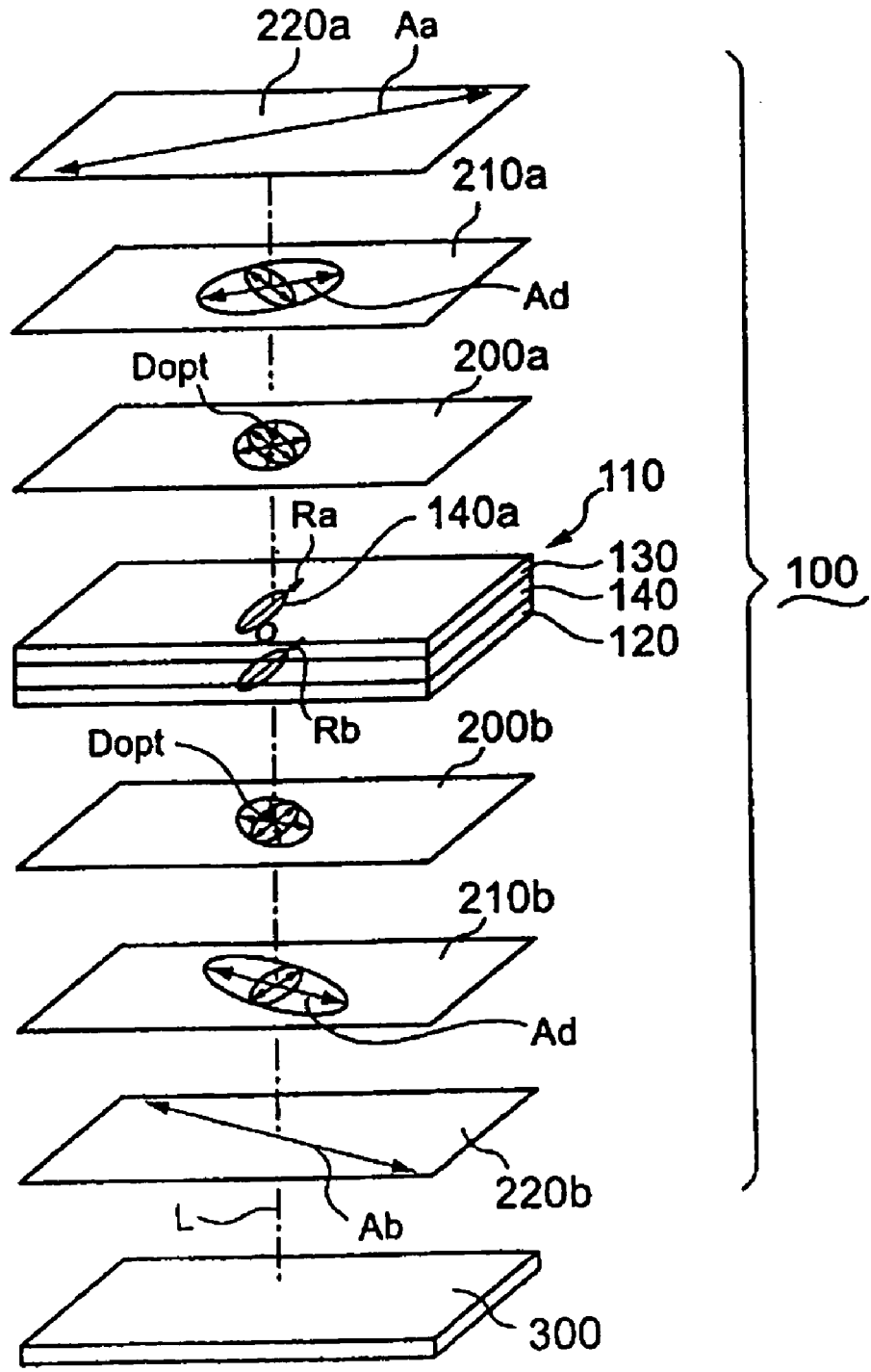
FIG. 9 is a schematic block diagram of the liquid crystal display panel according to the embodiment 1.
Figure 10:
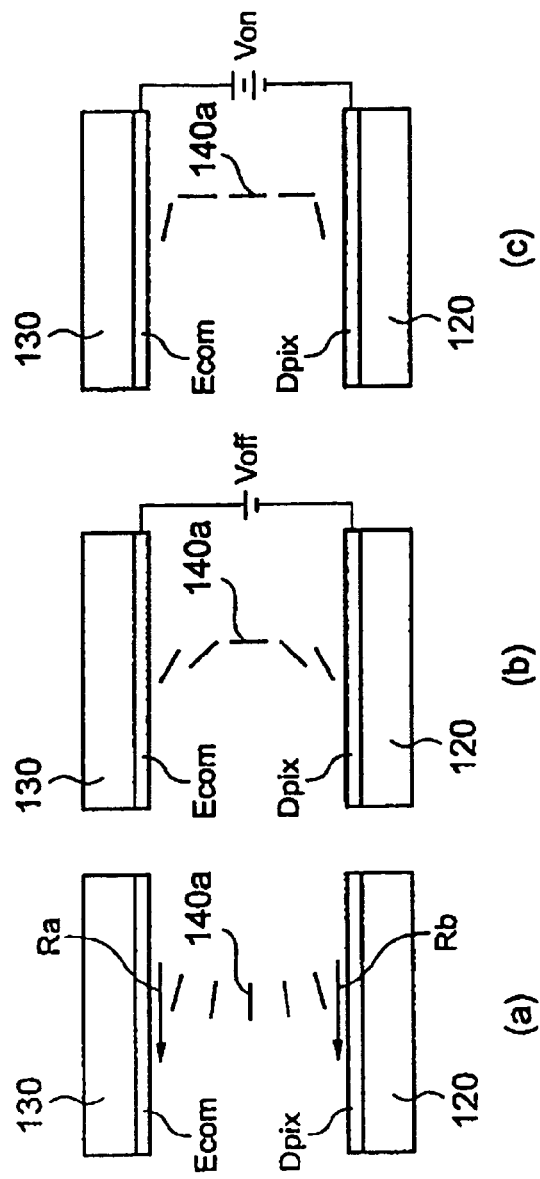
FIG. 10(a), FIG. 10(b) and FIG. 10(c) are schematic diagrams explaining operation of the embodiment 1.
Figure 11:
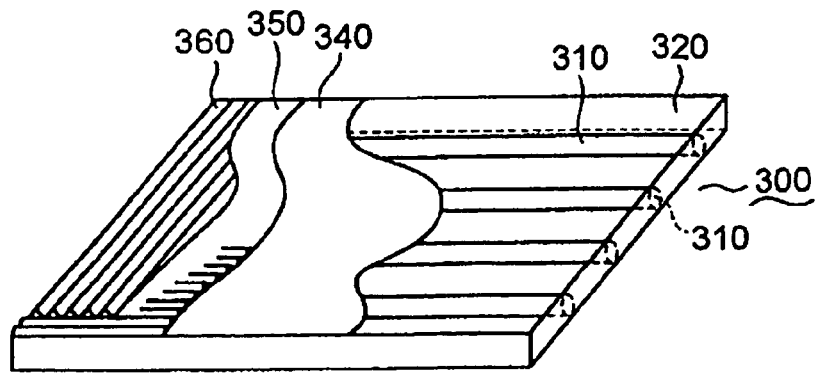
FIG. 11 is a schematic cross sectional view of the backlight according to the embodiment 1.
Figure 12:
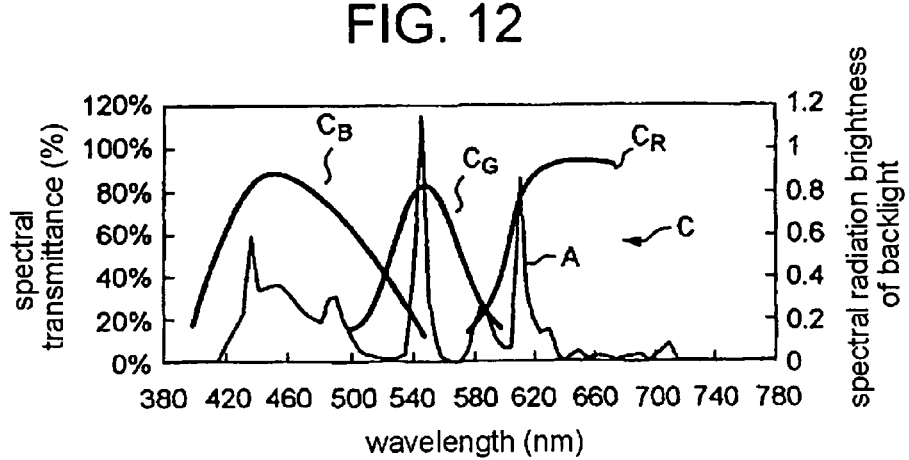
FIG. 12 is a diagram of curves showing the spectral radiation brightness characteristics of the lamp of the backlight, and the spectral transmittance of the red, green, blue filter layers.
Figure 13:
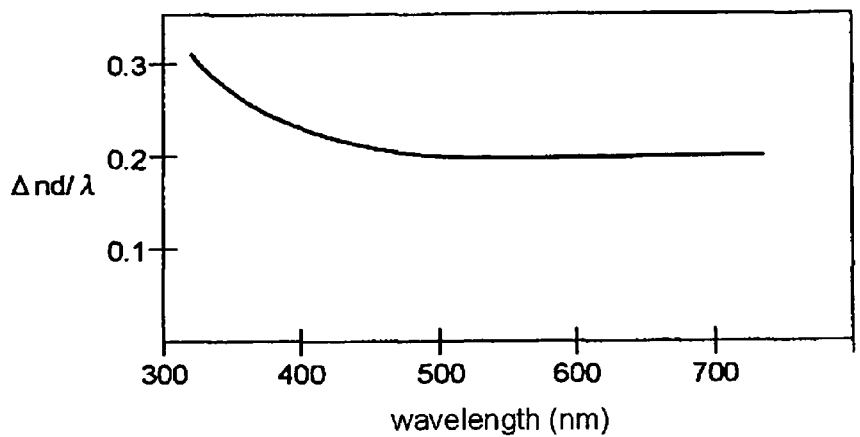
FIG. 13 is a diagram of the characteristic curve of Δn·d/λ of the liquid crystal layer to the wavelength for explaining the present invention.
Figure 14:
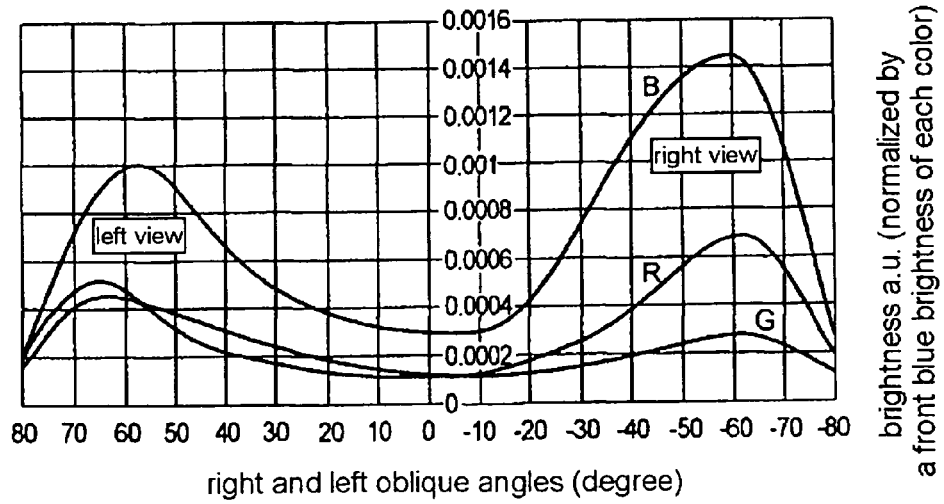
FIG. 14 is a diagram of curves showing respective color brightness ratios for the front of the display screen and an oblique viewing angle to explain the present invention.
Figure 15:
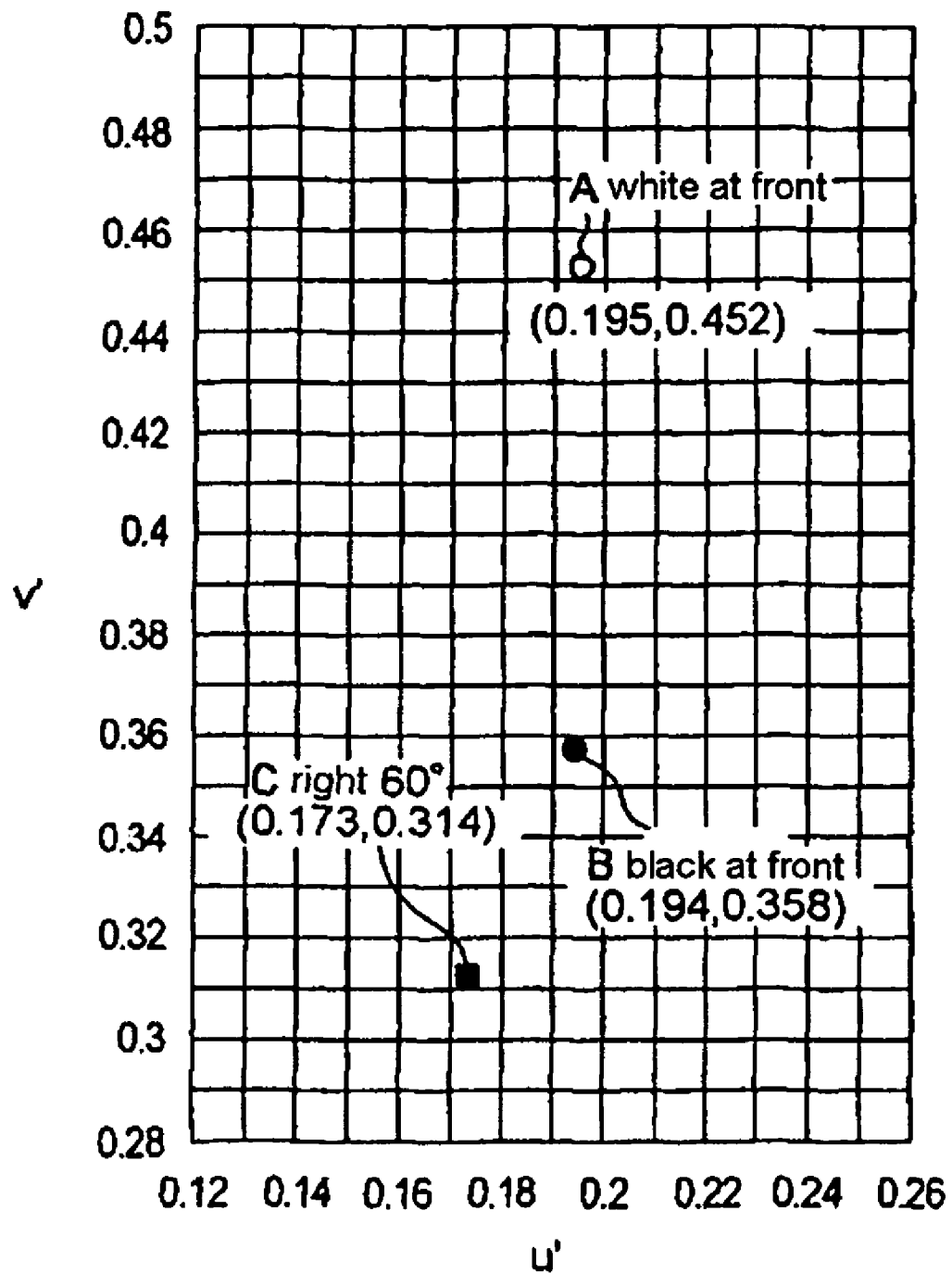
FIG. 15 is a u'V' chromaticity diagram for explaining the present invention.
Figure 16:
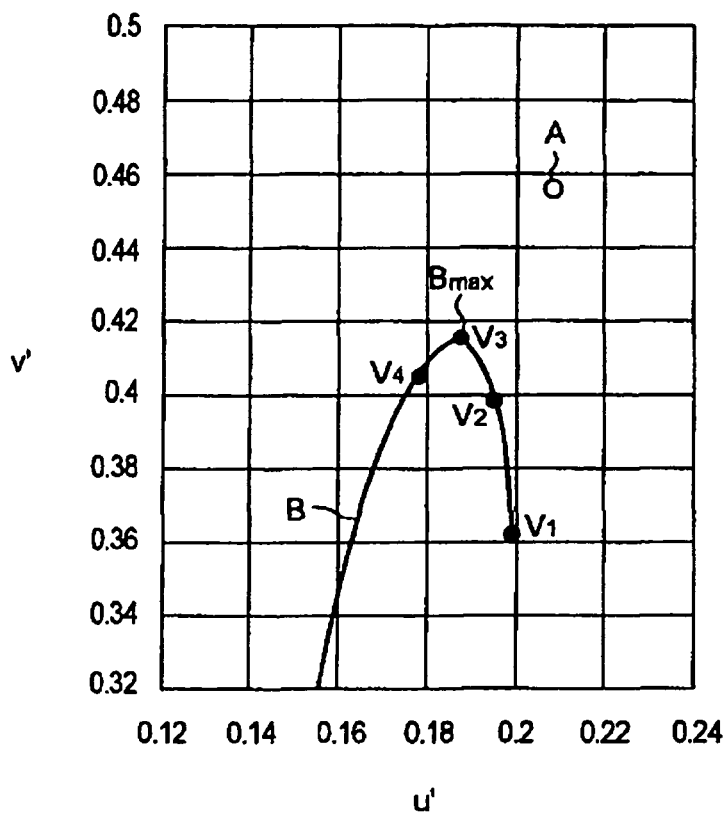
FIG. 16 is a u'V' chromaticity diagram for explaining the present invention when the maximum voltage value of the blue pixel electrode in the black display is varied.
Figure 17:
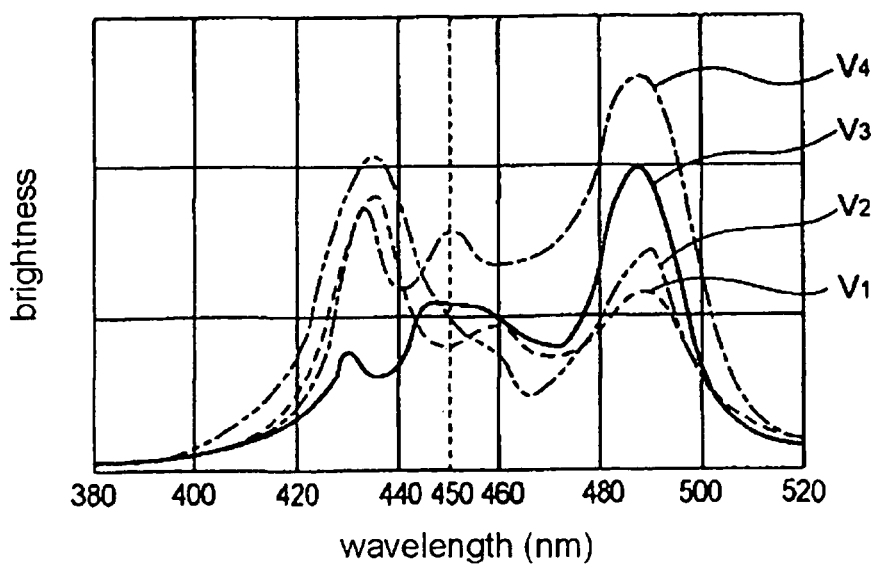
FIG. 17 is a diagram of curves showing the spectral brightness characteristics of the blue color region for explaining the present invention.
Figure 18:
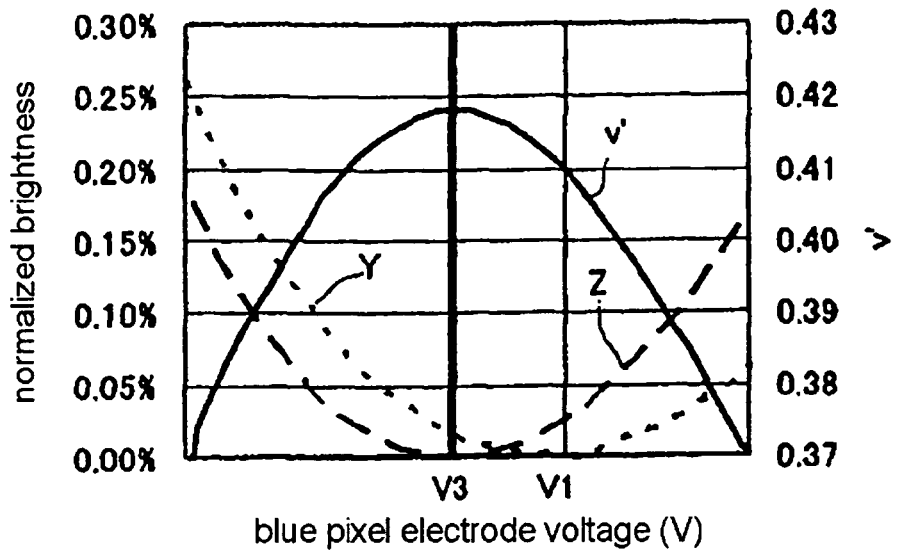
FIG. 18 is a diagram of curves showing normalized values of the brightness of Y, Z and v' chromaticity value to the blue pixel electrode voltage.
Figure 19:
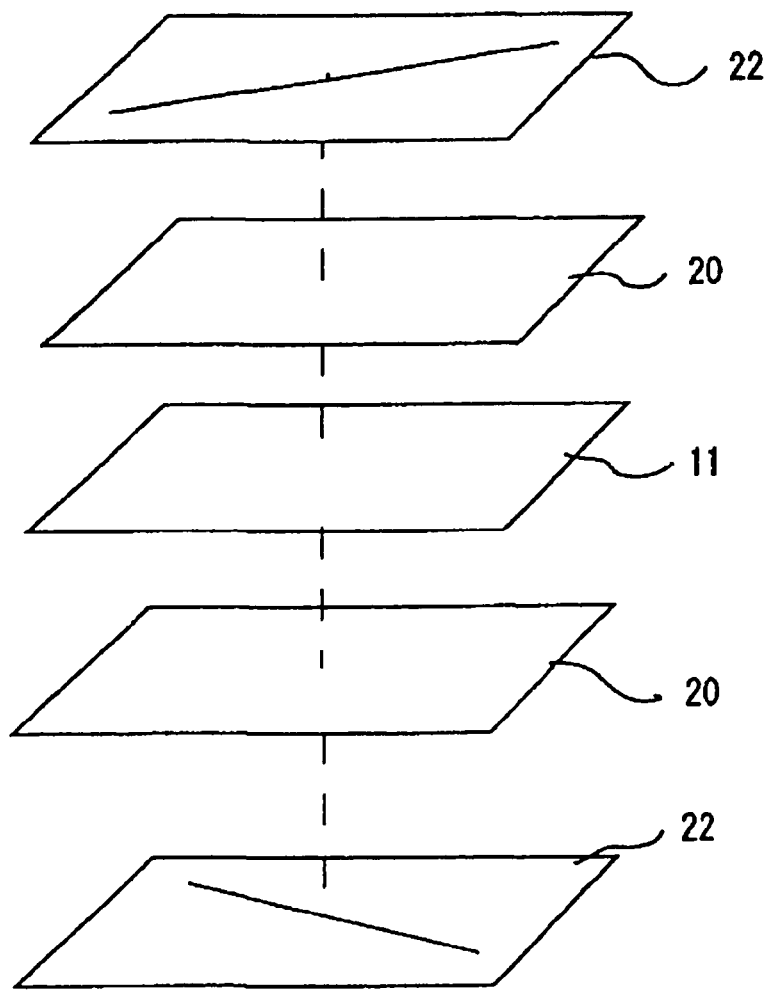
FIG. 19 is a schematic block diagram of the general OCB mode liquid crystal display cell.

110: liquid crystal display cell
120: array substrate
Dpix: pixel electrode
dpixR: red pixel electrode
dpixG: green pixel electrode
dpixB: blue pixel electrode
130: opposing substrate
Ecom: opposing electrode
dB, dG, dR: gap distance between the electrodes
CF(R), CF(G), CF(B): filter layer
140: liquid crystal layer
200a, 200b: hybrid phase difference plate
220a, 220b: polarization plate
300: backlight
500: signal line drive circuit

What is claimed is:

1. A liquid crystal display device comprising:
a liquid crystal display cell comprising:
an array substrate having a pixel electrode for each color of red, green, and blue arranged on the display screen in a matrix form,
an opposing substrate having an opposing electrode arranged in such a manner as to face the pixel electrodes of the array substrate,
an alignment layer formed on the pixel electrode and the opposing electrode,
a liquid crystal layer arranged in a bend alignment interposed between the array substrate and the opposing substrate, and
a filter comprising a red filter layer, a green filter layer, and a blue filter layer provided on one side of the substrates, the red filter layer being arranged corresponding to the red pixel electrode, the green filter layer being arranged corresponding to the green pixel electrode, and the blue filter layer being arranged corresponding to the blue pixel electrode;
a phase difference plate arranged on at least one of main surfaces of the liquid crystal display cell;
a pair of polarization plates arranged so as to interpose the liquid crystal display cell and the phase difference plate in the crossed-Nicol configuration; and
a voltage supplying source supplying the voltage applied to the blue pixel electrode in black display being different from the voltages applied to the red and green pixel electrodes in black display, and the voltage of the blue pixel electrode in black display being set to a voltage making the v' value of the u' v' chromaticity diagram become the maximum.

2. The liquid crystal display device as described in claim 1, further comprising a backlight source arranged on one side of the polarization plate, having light emission peaks in light wavelength regions appropriate to the red, green, and blue filter layers respectively, and the blue wavelength region having light emission peaks at a longer wavelength side and a shorter wavelength side with reference to 450 nm.

3. The liquid crystal display device as described in claim 1, wherein the phase different plate comprises a hybrid phase difference plate and a double-axial phase difference plate.

4. The liquid crystal display device according to claim 1, wherein the voltage of the blue pixel electrode in the black display does not exceed 4.03V.

5. A liquid crystal display device comprising:
a liquid crystal display cell comprising:
an array substrate having a pixel electrode for each color of red, green, and blue arranged on the display screen in a matrix form,
an opposing substrate having an opposing electrode arranged in such a manner as to face the pixel electrodes of the array substrate,
an alignment layer formed on the pixel electrode and the opposing electrode,
a liquid crystal layer arranged in a bend alignment interposed between the array substrate and the opposing substrate, and
a filter comprising a red filter layer, a green filter layer, and a blue filter layer provided on one side of the substrates, the red filter layer being arranged corresponding to the red pixel electrode, the green filter layer being arranged corresponding to the green pixel electrode, and the blue filter layer being arranged corresponding to the blue pixel electrode;
a phase difference plate arranged on at least one of main surfaces of the liquid crystal display cell;
a pair of polarization plates arranged so as to interpose the liquid crystal display cell and the phase difference plate in the crossed-Nicol configuration; and
a voltage supplying source supplying the voltage applied to the blue pixel electrode in black display being different from the voltages applied to the red and green pixel electrodes in black display, and the maximum voltage of the blue pixel electrode being set to a voltage making the Z value of the XYZ stimulus value become the minimum.

6. The liquid crystal display device as described in claim 5, further comprising a backlight source arranged on one side of the polarization plate, having light emission peaks in light wavelength regions appropriate to the red, green, and blue filter layers respectively, and the blue wavelength region having light emission peaks at a longer wavelength side and a shorter wavelength side with reference to 450 nm.

7. The liquid crystal display device as described in claim 5, wherein the phase different plate comprises a hybrid phase difference plate and a double-axial phase difference plate.

8. The liquid crystal display device according to claim 5, wherein the voltage of the blue pixel electrode in the black display does not exceed 4.03V.

9. A liquid crystal display device comprising:
a liquid crystal display cell comprising:
- an array substrate having a pixel electrode for each color of red, green, and blue arranged on the display screen in a matrix form,
- an opposing substrate having an opposing electrode arranged in such a manner as to face the pixel electrodes of the array substrate,
- an alignment layer formed on the pixel electrode and the opposing electrode,
- a liquid crystal layer arranged in a bend alignment interposed between the array substrate and the opposing substrate, and
- a filter comprising a red filter layer, a green filter layer, and a blue filter layer provided on one side of the substrates, the red filter layer being arranged corresponding to the red pixel electrode, the green filter layer being arranged corresponding to the green pixel electrode, and the blue filter layer being arranged corresponding to the blue pixel electrode;
- a phase difference plate arranged on at least one of main surfaces of the liquid crystal display cell, the phase different plate comprising a hybrid phase difference plate;
- a pair of polarization plates arranged so as to interpose the liquid crystal display cell and the phase difference plate in the crossed-Nicol configuration; and
- a voltage supplying source supplying the voltage applied to the blue pixel electrode in black display being different from the voltages applied to the red and green pixel electrodes in black display, and the voltage of the blue pixel electrode in black display being set to a voltage making the v' value of the u' v' chromaticity diagram become the maximum.

10. The liquid crystal display device according to claim 9, wherein the voltage of the blue pixel electrode in the black display does not exceed 4.03V.

* * * * *